US011452988B2

United States Patent
Jensen et al.

(10) Patent No.: US 11,452,988 B2
(45) Date of Patent: Sep. 27, 2022

(54) PHOTOCATALYTIC CONCRETE PRODUCT AND A METHOD TO PRODUCE A PHOTOCATALYTIC CONCRETE PRODUCT

(71) Applicant: Photocat A/S, Roskilde (DK)

(72) Inventors: Henrik Jensen, Olstykke (DK); Theis Reenberg, Copenhagen N (DK); Simon Lausten Ostergaard, Copenhagen N (DK)

(73) Assignee: Photocat A/S, Roskilde (DK)

( * ) Notice: Subject to any disclaimer, the term of this patent is extended or adjusted under 35 U.S.C. 154(b) by 686 days.

(21) Appl. No.: 15/553,765

(22) PCT Filed: Feb. 26, 2016

(86) PCT No.: PCT/DK2016/050054
§ 371 (c)(1),
(2) Date: Aug. 25, 2017

(87) PCT Pub. No.: WO2016/134728
PCT Pub. Date: Sep. 1, 2016

(65) Prior Publication Data
US 2018/0029011 A1 Feb. 1, 2018

(30) Foreign Application Priority Data
Feb. 27, 2015 (DK) .......................... PA 2015 70114

(51) Int. Cl.
*B01J 21/06* (2006.01)
*B01J 35/00* (2006.01)
(Continued)

(52) U.S. Cl.
CPC ........ *B01J 21/063* (2013.01); *B01D 53/8637* (2013.01); *B01D 53/8687* (2013.01);
(Continued)

(58) Field of Classification Search
CPC .. B01J 21/063; B01J 35/0013; B01J 35/0006; B01J 37/0219; B01J 35/004; C04B 41/87;
(Continued)

(56) References Cited

U.S. PATENT DOCUMENTS 3,239,479 A * 3/1966 Roenicke ............ C04B 24/2682
524/8
4,098,562 A * 7/1978 Levin ........................ B28B 5/04
425/121
(Continued)

FOREIGN PATENT DOCUMENTS

CN 102361686 A 2/2012
CN 102989522 A 3/2013
(Continued)

OTHER PUBLICATIONS

Monument Chemical "Propylene Glycol-Technical Product Information" (Year: 2018).*
(Continued)

*Primary Examiner* — Steven J Bos
*Assistant Examiner* — Syed T Iqbal
(74) *Attorney, Agent, or Firm* — Taft Stettinius & Hollister LLP (57) ABSTRACT

The present invention relates to a photocatalytic concrete product and a method to produce a photocatalytic concrete product. In first aspect the invention relates to method of producing photocatalytic concrete product, said concrete product being photocatalytic by containing nano sized photocatalytic particles embedded in an section including a first surface, said first surface forming an exterior surface when the photocatalytic concrete product is used as cover/lining. The method comprises: providing a not-yet-set concrete product having a first surface, applying a dispersion containing nano sized photocatalytic particles, such as titanium dioxide nanoparticles a solvent including a humectant onto said first surface of the not-yet-set concrete product.

24 Claims, 2 Drawing Sheets

(51) Int. Cl.
| | |
|---|---|
| C04B 41/00 | (2006.01) |
| C04B 41/50 | (2006.01) |
| B01D 53/86 | (2006.01) |
| B01D 53/88 | (2006.01) |
| B01J 37/02 | (2006.01) |
| C04B 41/87 | (2006.01) |
| C04B 41/65 | (2006.01) |
| C04B 111/00 | (2006.01) |

(52) U.S. Cl.
CPC ............ *B01D 53/88* (2013.01); *B01J 35/004* (2013.01); *B01J 35/0006* (2013.01); *B01J 35/0013* (2013.01); *B01J 37/0219* (2013.01); *C04B 41/009* (2013.01); *C04B 41/5041* (2013.01); *C04B 41/65* (2013.01); *C04B 41/87* (2013.01); *B01D 2255/20707* (2013.01); *B01D 2255/802* (2013.01); *B01D 2255/9202* (2013.01); *B01D 2257/708* (2013.01); *B01D 2258/06* (2013.01); *C04B 2111/00827* (2013.01)

(58) Field of Classification Search
CPC ... C04B 41/65; C04B 41/5041; C04B 41/009; C04B 2111/00827; C04B 2111/00017; B01D 53/88; B01D 53/8687; B01D 53/8637; B01D 2255/9202; B01D 2258/06; B01D 2257/708; B01D 2255/20707; B01D 2255/802; B01D 53/8625; C02F 2305/10; C02F 1/30

See application file for complete search history.

(56) References Cited

U.S. PATENT DOCUMENTS

| | | | | |
|---|---|---|---|---|
| 4,331,628 | A * | 5/1982 | Ziegler | ............... B28B 7/364 264/553 |
| 5,948,157 | A * | 9/1999 | McKenney | ......... C04B 20/1037 106/711 |
| 6,409,821 | B1 | 6/2002 | Cassar et al. | |
| 2004/0104511 | A1* | 6/2004 | Griffith | ................. B28B 7/0061 264/293 |
| 2012/0064787 | A1* | 3/2012 | Brummerstedt Iversen ................ B82Y 30/00 442/102 |
| 2018/0029011 | A1 | 2/2018 | Jensen et al. | |

FOREIGN PATENT DOCUMENTS

| | | |
|---|---|---|
| EP | 0919667 A1 | 6/1999 |
| EP | 1997860 A1 | 12/2008 |
| JP | 2006102567 A | 4/2006 |
| KR | 20100113971 A | 10/2010 |
| WO | 2010110726 A1 | 9/2010 |
| WO | 2014168576 A1 | 10/2014 |
| WO | WO-2014168576 A1 * | 10/2014 ............ B01J 35/004 |

OTHER PUBLICATIONS

International Search Report; European Patent Office; International Application No. PCT/DK2016/050054; dated May 19, 2016; 3 pages.
Written Opinion of the International Searching Authority; European Patent Office; International Application No. PCT/DK2016/050054; dated May 19, 2016; 5 pages.
International Preliminary Report on Patentability; The International Bureau of WIPO; International Application No. PCT/DK2016/050054; dated Jun. 12, 2017; 15 pages.
Chinese Office Action, State Intellectual Property Office of China, Chinese Application No. 201680024296.8, dated Oct. 29, 2019, 11 pages.
Concrete Information—Concrete Slab Surface Defects: Causes, Prevention, Repair; Portland Cement Foundation; IS177; Copyright 2001 Portland Cement Association; 16 pages.
Problems with Concrete—Laitance; Dulux Protective Coatings; PC Tech Notes, Dulux Protective Coatings Technical Information and Advice; Sep. 2009; 1 page.

\* cited by examiner

PHOTOCATALYTIC CONCRETE PRODUCT AND A METHOD TO PRODUCE A PHOTOCATALYTIC CONCRETE PRODUCT

CROSS-REFERENCE TO RELATED APPLICATIONS

This application is a U.S. national stage filing of International Application No. PCT/DK2016/050054 filed Feb. 26, 2016, which claims priority to Denmark Patent Application No. PA 2015 70114 filed Feb. 27, 2015, each of which are incorporated herein by reference in their entirety.

FIELD OF THE INVENTION

The present invention relates to a photocatalytic concrete product and a method to produce a photocatalytic concrete product.

BACKGROUND OF THE INVENTION

Air pollution in open areas with motorized traffic, such as in car parks, is found to a be major problem. For instance, the concentration of NOx in such areas are often found to be very high both as annual average values and as peak values which may give rise to e.g. respiratory diseases in human or animals staying for prolonged periods in such areas or in periods with high peak values.

Photocatalytic compounds, such as $TiO_2$, can be used to produce smart and active building materials that can reduce e.g. the high level of pollutant that poses a threat to human or animal health in big cities and in areas with high air pollution. One strategy is to apply photocatalytic compounds in a post-production step to building surfaces that are irradiated by the sun light during the day. For example, linings of roads, car parks and pavements are surfaces that are exposed to sun light for several hours during the day. Such post-production step may include cleaning of the surfaces and then spraying the lining with a dispersion containing photocatalytic particles.

Another strategy is to mix photocatalytic titanium dioxide powder with cement and other binders materials to produce photocatalytic linings for pavements. One drawback of these materials is the large amount of titanium dioxide powder used, as titanium dioxide powder has to be mixed in large quantity so as to achieve acceptable activity towards the reduction of pollutants and only the titanium dioxide powder available at the surface of the lining is available for photocatalytic reactions. Furthermore, the large quantities of titanium powder may affect the colour of the final material as well as the material properties.

Concrete products for linings e.g. for pavements, roads, car parks etc. may be produced in a highly automated process in which not-yet-set concrete is filled into a mould, and subsequently compacted whereafter the mould is released from the not-yet-set concrete product. Another way of producing such linings is to cast the linings on-site, that is the applying the not-yet-set concrete at the site where it is to form the lining. Due to the relatively low water content in the not-yet-set concrete and the compacting, the concrete product is relatively form stable and is left for setting in a large setting facility where no mechanical impacts are imparted on the not-yet-set concrete. In order not adversely affects the automated production of such concrete products, it would be advantageous if the photocatalytic materials could be applied to the not-yet-set concrete product prior to the product being left for setting.

As the photocatalytic material to be applied to the concrete product should advantageously be incorporated in the product in an outer most section, such as a section extending from the surface forming the visible surface during use of the product and some distance into the product in order to account for wear of the product (if the photocatalytic material is applied as a coating, it would be worn of), some mechanism for transporting the photocatalytic material into the concrete product through a surface could be considered.

It has been found in connection with the present invention that by applying, e.g. by spraying a dispersion of water and $TiO_2$ onto the surface of a not-yet-set concrete product will produce the effect of the photocatalytic material being transported into the concrete product, but importantly has the disadvantage of producing laitance.

Laitance is observed to be a white/grey, often relatively thin, solid layer appearing on top of the concrete product and acting as a solid coating. Laitance is the result of thin weak layer composed of water, cement, and fine particles. Laitance may occur due to for example a) water applied during finishing or setting b) too wet a mixture and c) lack of proper curing especially due to rapid drying of the surface. Laitance occurs during setting time of the concrete. The time it takes for the cement and water to react to create a hardened concrete is typically defined as the setting time. During the setting time cement and aggregate particles are partly suspended in the water. The cement and aggregates are heavier than water and tend to sediment in the water phase. As the cement and aggregates move downwards the smaller aggregates moves upwards and display on the surface as a weak layer, the so-called laitance. Laitance has been found to be highly undesired as seen both from an aesthetic point of view as it may cover the intended appearance of the surface and from a technical point of view as it may weaken the concrete and importantly may prevent the overall and/or long term photocatalytic effects of the $TiO_2$.

Thus, an efficient method to produce photocatalytic concrete products could be advantageous.

In particular, a method of producing photocatalytic concrete products which employs low amount of catalytic materials and achieves high activity in degradation of pollutants, such as NOx, $SO_2$ or other Volatile Organic Compound (VOC), could be advantageous.

Object of the Invention

It may be seen as an object of the invention to provide a method to produce photocatalytic concrete products having high activity towards degradation of air and water pollutants, and reduction of algae growth.

It may be seen as another object of the invention to provide a photocatalytic concrete product, such as a linings, having high activity towards degradation of air and/or water pollutants and/or algae growth.

It is an object of the present invention to wholly or partly overcome the above disadvantages and drawbacks of the prior art.

An object of the present invention is to provide an alternative to the prior art.

In particular, it may also be seen as an object of the present invention to provide a more efficient and low cost method of production of photocatalytic concrete products for linings.

SUMMARY OF THE INVENTION

Thus, the above described object and several other objects are intended to be obtained in a first aspect of the invention by providing a method of producing photocatalytic concrete product, said concrete product being photocatalytic by containing nano sized photocatalytic particles embedded in an section including a first surface, said first surface forming an exterior surface when the photocatalytic concrete product is used as cover/lining, the method comprises:
  providing a not-yet-set concrete product having a first surface
  applying a dispersion containing
    nano sized photocatalytic particles, such as titanium dioxide nanoparticles
    a solvent including a humectant
  onto said first surface of the not-yet-set concrete product.

By applying the dispersion to the surface of the not-yet-set concrete product, the dispersion will penetrate into the not-yet-set concrete and thereby at least a part of the nano sized photocatalytic particles will be transported into the concrete product, while some particles will be available at the surface of the concrete product. As presented herein, only a section of the concrete product extending from the first surface and into the concrete product will have nano sized photocatalytic particles embedded after the applying the dispersion.

In the present context a number of terms are used in a manner being ordinary to a skilled person. Some of these terms are detailed below.

Concrete is used to designate a composite material comprising or composed mainly of water, aggregate, and cement.

Set is used with reference to the process of the concrete from being liquid to form a solid. The concrete when solid is referred to as set. It is noted that the solidification does not occurs instantaneously, however, within the scope of this application is considered that the concrete is liquid while it still is shapeable without inducing cracks or other damages on a macro-scale (the scale of the concrete product).

Not-yet-set is used to indicate concrete which has not yet solidified whereby the concrete may still be shaped in a non-destructive manner.

Form stable is used to indicate a not-yet-set concrete which may be formed into a desired shape and which if only influenced by gravity will maintain the form provided.

Nano sized particle is used to indicate that the dimension of the particle in question is in the range of between $1*10^{-9}$ and $100*10^{-9}$ meter, such as between $1*10^{-9}$ and $1000*10^{-9}$ meter. The dimension may be determined as the average particle size in the dispersions (measured by Volume) or as the geometrical average of the size of the particles, or based on an equivalent diameter determined as the cubic root of mass/density$*4/3/\pi$ (Pi).

Lining is used to indicate a structural element of a road, pavement walk path, car park etc. which is applied to provide the surface thereof. Cover is used to indicate an element used to provide covering.

The photocatalytic concrete product may be a photocatalytic concrete paving element or a photocatalytic concrete building element. Non-limiting examples of a photocatalytic concrete product may be a photocatalytic concrete road or photocatalytic concrete sidewalk, a photocatalytic concrete façade or photocatalytic concrete roofing, and it may be photocatalytic concrete flooring (indoor or outdoor), photocatalytic concrete ceiling and/or photocatalytic concrete walls (interior and/or exterior). It may be a photocatalytic concrete bridge. It may be a Noise Barrier Wall placed for instance next to a high way.

Discrete particle is used to indicate that the particle is not included in a continuous matrix layer comprising other materials. Thus, discrete nanoparticles may be particles that are separated from each other. Discrete nanoparticles may also be nanoparticles connected to each other forming a porous network of nanoparticles that are not included within a matrix layer. A matrix layer may be a layer comprising binders or other materials.

Further aspects and embodiments of the first aspect are presented in the accompanying claims.

The dispersion may comprise or further comprise a humectant selected from glycol, such as glycerol, 1,2-butanediol, 1,4-butanediol, propylene glycol, dipropylene glycol, ethylene glycol, diethylene glycol, triethylene glycol, hexasol, 1,5-pentanediol, 3-methyl-1,5-pentanediol, isoprene glycol, polyethyleneglycols, polypropyleneglycols, polyethyleneglycol methyl ethers, polypropyleneglycol methyl ethers and/or amines, such as ethanolamine, propanolamines, triethanolamine, polyoxyethyleneamines, polyoxypropyleneamines, polyoxyethylene monoamines, polyoxypropylene monoamines.

Without being bound by theory, the inventors have found that the humectant limits the evaporation of solvent, preferably water, from the surface and thereby increasing the setting time of the concrete and thereby improving the properties such as strength of the surface of the concrete. The setting time may be increased by more than 10, 20, 25, 50, 100% compared to the product without humectant.

The humectant may be present in the dispersion in the range of 1-99 wt %, such as 1-70 wt %, preferably 25-60 wt %, more preferably in the range 35-50 wt %.

The humectant may be present after setting of the concrete (top 5 mm) in the photocatalytic concrete product in the range of 0.75 wt %-7.5 wt %, preferably in the range of 0.38 wt %-3.8% or in the range of 1.5 vol %-15 vol %, preferably in the range of 0.15 vol %-7.5 vol %.

The dispersion comprising humectant and/or electrostatic stabilizer and/or sterical stabilization agent limits the mobility of the cement and aggregate particles in the outermost layer involving the dispersion, thereby improving the properties of the concrete such as strength and visual appearance.

Preferably, the humectant has a viscosity larger than 1 cSt, preferably >larger than 5 Cst such as larger than 10, or even larger than 14 Cst.

Preferably, the dispersion has a viscosity larger than 1 cSt, preferably >larger than 5 Cst such as larger than 10, or even larger than 14 Cst.

The dispersion may comprise or further comprise a silica containing compounds in a range between up to 15 wt %, for example 10 wt % or 5 wt % or 2.5 wt % or 1.0 wt % such as the composition further comprises a silica compound, preferably an alkali silicate such as sodium silicate, lithium silicate and/or potassium silicate. Alkali silicates, also known as waterglass, improve surface properties of a concrete element. Or such as the silica compound may comprise silica, silanes and/or siloxanes to obtain improved properties of the above mentioned photocatalytic concrete.

The dispersion may comprise or further comprise a pH-stabilizing agent, such as alkaline; for example amines and/or ammonia. The dispersion may comprise or further comprise an electrostatics stabilizing agent, such as alkaline compounds; for example amines and/or ammonia.

The dispersion may further comprise a sterical stabilisation agent(s) with pigment affinic group such as a wetting and/or dispersing additive for aqueous and solvent systems and/or deflocculating additive, such as composed of copolymers with pigment affinic groups.

The dispersion applied such as sprayed is preferably a stable dispersion, i.e. nanoparticles remain in solution without precipitating.

As the nano sized photocatalytic particles, preferably titanium dioxide nanoparticles, are distributed in the first layer, some of those particles will be distributed on the first surface thereby providing a photocatalytic effect on the first surface (when exposed to light). Thus, high activity towards NOx degradation and/or algae reduction can be achieved through the use of a photocatalytic concrete product according to the invention.

For example, a photocatalytic concrete product comprising a low amount of titanium dioxide per $m^2$, such as lower than 10 gr per $m^2$, for example 3-5 gr per $m^2$, in the first layer, provides a NOx degradation higher than 5%, for example up to 15%. It noted that the distribution of such nano sized photocatalytic particles are considered evenly distributed in the first layer. It is noted that the amount per $m^2$ may be determined either as the amount applied per $m^2$ or the actual total mass of nano sized photocatalytic particles in the concrete product divided by the surface area of the concrete product. Further, the surface area is typically defined as the area defined by the geometrical extremities of the concrete product, e.g. in case of a rectangular shaped concrete product, the area is typically defined as the length multiplied by the width. Thus, in the determination of the surface area, the porosity of the concrete product is typically not taken into account.

Thus, the photocatalytic concrete product of the invention may have an activity towards NOx degradation higher than 2.5%, such as 5.0% or 7.5%, 10% or 15% (ISO 22197-1). The photocatalytic concrete product may have a high activity towards algae reduction after several years.

By the present invention, the visual impression of the product remains essentially the same as it would have had with no nano sized photocatalytic particles. In one embodiment, the photocatalytic titanium dioxide particles may have a primary size less than 100 nm. Particle primary size, also called crystalline size, is defined as the particle size of the particles in the dispersion thus when the particles are not agglomerated. Particle primary size may be in the area of 30 nm±10 nm.

In some embodiments the photocatalytic titanium dioxide particles may have a primary size in the range between 5 to 250 nm, preferably between 5 to 100 nm, more preferably between 5 to 50 nm, most preferably between 5 and 30 nm. In some other embodiments, the titanium dioxide particles may have an agglomerate size of less than 300 nm, less than 200 nm, less than 100 nm, such as less than 80 nm preferably an aggregate size of less than 60 nm, such as of less than 40 nm and even more preferably an aggregate less than 30 nm, such as less than 20 nm.

In some other embodiments, the photocatalytic titanium dioxide nanoparticles are in anatase phase. For example, at least 80% of the photocatalytic titanium dioxide nanoparticles deposited in and thus comprised in the photocatalytic concrete product are in the anatase crystalline phase. In some embodiments, the photocatalytic titanium dioxide nanoparticles deposited in and thus comprised in the concrete product are 100% in anatase phase.

In some further embodiments, the titanium dioxide nanoparticles may be in anatase phase doped with other chemical elements. For example, they may be doped with carbon. Doped anatase has the advantage of increasing the spectrum of light that can be used for photocatalytic reactions. For example, by carbon doping the anatase, light in the visible region can be used to trigger photocatalytic reaction on the titanium dioxide and thus on the product comprising the doped titanium dioxide. The use of doped anatase and in particular carbon doped anatase may have also the advantage of efficiently reducing algae growth, as algae growth often occurs on location with limited/diffused light, i.e. location where the UV component of the light is rather limited. By use of doped $TiO_2$ the photocatalytic activity according to ISO 22197-1 may be increased by 10%, 20%, 25%, 30%, 40%, 50% or even 100% in sun light condition.

In a second aspect, the invention relates to a photocatalytic concrete product comprising:
  a set concrete product;
  photocatalytic nano sized particles embedded in a first section of the concrete product, said first section extend from a first surface and at least 1 mm inward, such as at least 2 mmm inward, preferably at least 5 mm inward,
  a humectant embedded in a first section of the concrete product said first section extend from a first surface and at least 1 mm inward, such as at least 2 mmm inward, preferably at least 5 mm inward Further aspects and embodiments of the second aspect are presented in the accompanying claims.

The first and other aspects and embodiments of the present invention may each be combined with any of the other aspects and embodiments. These and other aspects of the invention will be apparent from and elucidated with reference to the embodiments described hereinafter.

BRIEF DESCRIPTION OF THE FIGURES

The method of producing concrete product and the concrete product according to the invention will now be described in more detail with regard to the accompanying figures. The figures show one way of implementing the present invention and are not to be construed as being limiting to other possible embodiments falling within the scope of the attached claim set.

DETAILED DESCRIPTION OF PREFERRED EMBODIMENTS

Figure 1:
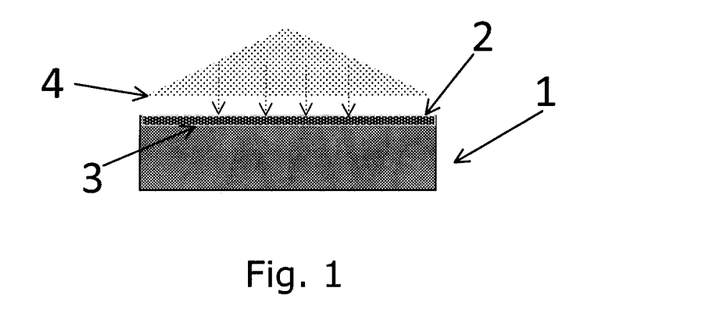
FIG. 1 shows a schematic drawing of a preferred embodiment of a production method for producing a photocatalytic concrete product.

Reference is made to FIG. 1 illustrating schematically a method of producing photocatalytic concrete product 1. The concrete product 1 being photocatalytic by containing nano sized photocatalytic embedded in a section 3 of the product which section includes a first surface 2 of the product. The first surface 2 forms an exterior surface, when photocatalytic concrete product 1 is used as lining. As shown in FIG. 1, the method comprises the step of applying a dispersion containing nano sized photocatalytic particles, such as titanium dioxide nanoparticles, and a solvent including a humectant onto said first surface 2 of the not-yet-set concrete product.

As the concrete is not-yet-set, the concrete is still porous and the dispersion will penetrate into the concrete forming the first section 3, in which the nano sized particles will be deposited. The thickness of the layer 3 may be controlled by the amount of dispersion applied and time left before the concrete sets.

As presented herein, the concrete prior to application of the dispersion containing the nano sized particles is not-yet-set. Within the meaning of this is that the concrete can be moulded into a given shape and that the not-yet-set concrete is form stable. This moldability while still being form stable is provided by selecting the water content in the concrete sufficiently low while still being high enough to assure a setting of the product. In making a concrete product the water to cement ratio is a crucial parameter as it affects the setting time and also the porosity and permeability, consequently, the water to cement ratio influences the concrete strength and other detrimental chemical and physical processes. The normal accepted ratio of water-to-cement is in the range of 0.3-0.7 w/c to obtain the optimal performance of the concrete, such as but not limited to form stable and strength.

As also presented herein, the laitance is avoided by including a humectant in the dispersion. A preferred humectant is selected from the group consisting of glycol, such as glycerol, 1,2-butanediol, 1,4-butanediol, propylene glycol, dipropylene glycol, ethylene glycol, diethylene glycol, triethylene glycol, hexasol, 1,5-pentanediol, 3-methyl-1,5-pentanediol, isoprene glycol, polyethyleneglycols, polypropyleneglycols, polyethyleneglycol methyl ethers, polypropyleneglycol methyl ethers and/or amines, such as ethanolamine, propanolamines, triethanolamine, polyoxyethyleneamines, polyoxypropyleneamines, polyoxyethylene monoamines, polyoxypropylene monoamines.

The dispersion may comprise or further comprise an electrostatics stabilizing agent, such as alkaline compounds; for example amines and/or ammonia.

The dispersion may further comprise a sterical stabilisation agent(s) with pigment affinic group such as a wetting and/or dispersing additive for aqueous and solvent systems and/or deflocculating additive, such as composed of copolymers with pigment affinic groups.

The dispersion is applied to the first surface 2 in an amount of less than 200 ml/m$^2$, such as 150 ml/m$^2$, for example less than 100 ml/m$^2$. In terms of amount of nano sized photocatalytic particles, the dispersion is applied to said first surface in an amount of less 10 g nano sized photocatalytic titanium dioxide/m$^2$, less than 5 g/m$^2$, less than 2.5 g/m$^2$.

In order to allow the dispersion to penetrate into the not-yet-set concrete product, typically without forming a liquid layer on top of the product due to setting of the concrete, the dispersion is applied to said first surface during a time period of less than 5 minutes, such as less than 2 minutes, preferably less than 1 minute, such as less than 30 seconds. Preferably, the amount measured in ml of dispersion received at the first surface per time unit is constant.

The dispersion is applied to said first surface 2 by spraying the dispersion as droplets 4 onto said first surface 2. The droplets are provided by feeding the dispersion through droplet forming nozzles arranged above the surface 2 of the product 1.

Figure 2:
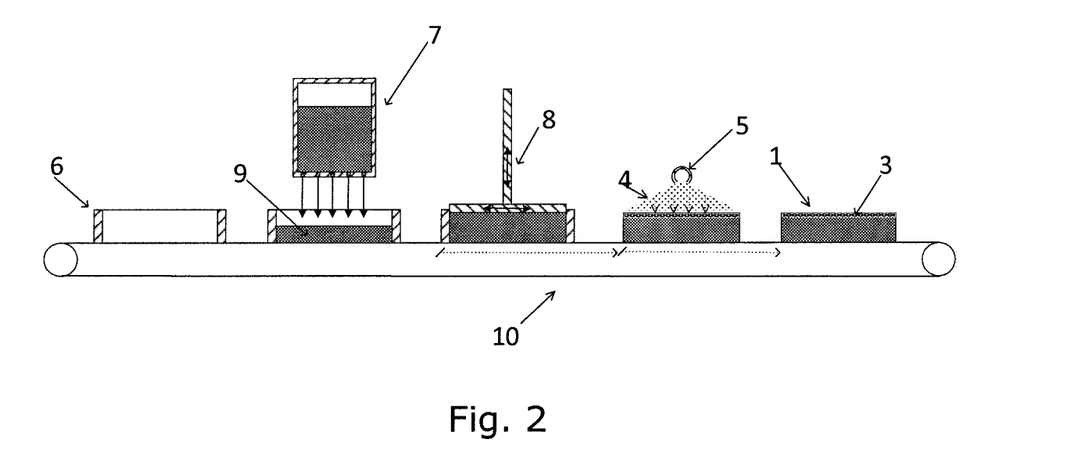
FIG. 2 shows a schematic drawing of a further preferred embodiment of a production method for producing the photocatalytic concrete product.

Reference is made to FIG. 2, showing a further embodiment of a method for producing a photocatalytic concrete product 1. As shown in FIG. 2, a mould 6 is arranged on a horizontally moving conveyer 10. The mould 6 is advanced to a position below a concrete filling machine 7 which fills not-yet-set concrete into the mould 6. After the desired amount of concrete is filled into the mould 6, the mould is advanced to a compacting position where the not-yet-set concrete in the mould 6 is compacted, preferably by vibrating and/or compressing the concrete while in the mould. As shown in FIG. 2, the compacting is carried out by pressing a piston 8 against the surface of the not-yet-set concrete arranged in the mould 6, while the piston 8 performs a horizontal reciprocating movement. The compacting provides a photocatalytic concrete product with a specific outer dimension, as the compacting assures that the concrete fills out the mould and reduces the thickness. Accordingly, the vertical movement of the piston 8 is limited downward to not exceed the thickness of the product. In some preferred embodiments, the filing and compacting is integrated in single operation and thus, the concrete product is not moved between filling and compacting.

The photocatalytic concrete product may also be applied in an on-site casting of the photocatalytic concrete product. In such embodiments, the not-yet-set concrete is applied to the position where it is to form the lining, typically vibrated to compact it, and the dispersion containing the nano sized photocatalytic particles is sprayed onto the surface of the non-yet-set concrete.

The compacting is preferably performed not later than 30 minutes, such as not later than 20 minutes, preferably not later than 10 minutes, such as not later than 5 minutes after the not-yet-set concrete 9 is filled into the mould 6 in order to assure that the concrete does not set prior to compacting and subsequent application of dispersion, as the dispersion is applied to the first surface 2 after compacting the not-yet-set concrete 9—in FIG. 2 this is shown by the concrete product being advanced to an application station where the dispersion is sprayed on to the surface 2. However, the dispersion may be applied to first surface 2 prior to compacting the not-yet-set concrete 9. In preferred embodiments, the compacting is in practise carried out within 30 seconds after the not-yet-set concrete is filled into the mould.

As the concrete is form stable prior to setting, the mould 6 can be removed from the concrete product before the concrete is set. This preferably means not later than 30 minutes, such as not later than 20 minutes, preferably not later than 10 minutes, such as not later than 5 minutes after being filled into the mould. This has inter alia the advantage that the concrete product does not need to be located in a mould during setting whereby the product made of not-yet-set concrete may be left without a mould for setting and the mould used for production of other products. Thus, the concrete product is allowed to set after the dispersion has been applied to the first surface.

The nano sized photocatalytic particles, are preferably titanium dioxide nanoparticles, and are preferably discrete particles. The nano sized photocatalytic particles, are in some embodiments chemically bond to the concrete and in other embodiments embedded in the concrete without chemical bonds.

Figure 3:
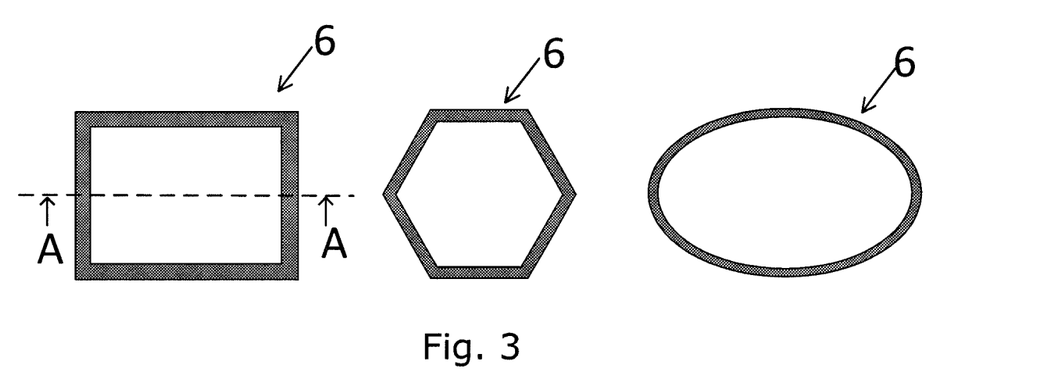
FIG. 3 shows a schematic drawing of different moulds used for shaping the photocatalytic concrete product.

FIG. 3 shows schematically three different shapes of moulds 6. However, the invention is not limited to those three shapes but any other shape of mould can be used as long as the concrete can mimic the shape of the mould. In FIG. 3 is also shown the line A-A showing the cross section along which the mould of FIG. 2 is shown.

Figure 4:
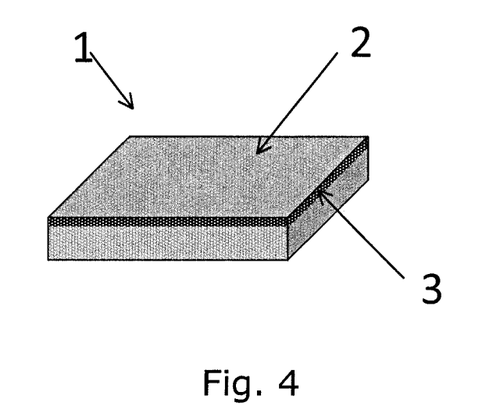
FIG. 4 shows a schematic 3-dimensional drawing of a photocatalytic concrete product according to a preferred embodiment of the invention; the product is preferably provided by a method according to the present invention.

Reference is made to FIG. 4 showing schematically a preferred embodiment of a photocatalytic concrete product 1. The concrete product 1 is a set concrete product 1 with photocatalytic nano sized particles embedded in a first section 3 of the concrete product 1. As shown, the first section 3 extends from a first surface (2) and at least 1 mm inward, such as at least 2 mm inward, preferably at least 5 mm inward. In a preferred embodiment, the first section 3 comprises photocatalytic titanium dioxide nanoparticles.

As the appearance of nano sized photocatalytic particles in the first layer 3 is provided so that no or substantial no colouring and/or laitance effect occurs as a result of applying the particles, the concrete product may be given other colours than the colour of the concrete. This may be provided by the concrete product comprising a colouring agent embedded at least in the first section (3) of the concrete product. In a preferred embodiment, the colouring agent is mixed into the concrete prior to be filled into a mould and in such embodiment, the colouring agent is present throughout the concrete product.

The photocatalytic composition including nano sized photocatalytic particles, humectant, optionally including a sterical stabilizer and a solvent is provided so that no or substantially no colouring and/or laitance effect occurs as a result of applying the particles and as the mobility of the cement and the aggregates is limited the distribution of e.g. cement, aggregate particles and nano sized photocatalytic TiO2 is substantially homogeneous distributed in the top layer of the concrete.

While the method shown in FIG. 1-3 discloses a production of photocatalytic concrete products off-site, that is the linings are not cast at the site where it is supposed to form a lining, the method disclosed herein may equally well be applied to casting photocatalytic concrete product on-site.

Example 1

Commercial concrete pavement blocks 50×50 cm², from Gammelrand Beton, were used to test the photocatalytic composition applied with spray nozzles on the not-yet-set concrete blocks. 100-150 g/m² of photocatalytic dispersion (PD) was applied on each concrete block with a hydraulic nozzle system. The photocatalytic dispersion was a 1.5 wt % water-based TiO$_2$ dispersion stabilized to pH 10-11 with ammonia including 42% diethylenglycol as humectant and 5% Disperbyk 191. The average particle size in the dispersions (measured by Volume with Nanotrac NPA 252) was measured to 22 nm. The pavement concrete blocks were sprayed and left for ambient drying for 72 hours. After 72 hours, the visual appearance of the photocatalytic pavement blocks were evaluated by comparing to commercial pavement concrete blocks, commercial concrete blocks sprayed with 100-150 g/m2 water, commercial pavement concrete blocks sprayed with a 1.5 wt % water based TiO$_2$ dispersion similar to PD but without humectant and without Disperbyk 191.

The products were evaluated with colour measurement and abrasion test. The abrasion test was performed by rubbing the surface with a black cloth and evaluating if a white residue was present on the cloth after rubbing. Colour was measured with a SpectroEye from X-Rite. The colour of the reference and the spray applied samples were recorded as Lab (L·a·b) values and used to calculate the colour change as:

$$\Delta L = \mathrm{abs}(L_{(Ref)} - L_{(Sample,x)})$$

$$\Delta E = \mathrm{sqrt}((L_{(Ref)} - L_{(Sample,x)})^2 + (a_{(Ref)} - a_{(Sample,x)})^2 + (b_{(Ref)} - b_{(Sample,x)})^2)$$

where the L scale defines light vs. dark and ΔE is the total colour difference.

TABLE 1

Evaluation of pavement concrete blocks.

|  | Reference | Water | Water with particles | Photocatalytic composition |
|---|---|---|---|---|
| ΔL | 0 | 20.0 | 21.7 | 0.48 |
| ΔE | 0 | 21.3 | 22.7 | 0.9 |
| Abrasion | No white residue | White residue | White residue | No white residue |

The colour evaluation of the samples tested in Example 1 showed that the photocatalytic product had the same colour as the reference whereas the product sprayed with only water and the product sprayed with a water based TiO$_2$ dispersion showed a clearly white colour compared to the reference when comparing the ΔL values and the overall color difference, ΔE. Furthermore, only the water and the water-based TiO$_2$ applied sample showed a white residue when tested for abrasion. Both the white colour and the white residue from the abrasion test is an indication of laitance deposited on the surface of the water and water-based TiO$_2$ applied products, whereas no laitance was present on the reference and the photocatalytic product.

Example 2

50×50 cm2 commercial grey pavement stones (Gammelrand Beton) were used to test the photocatalytic activity of the photocatalytic composition applied to the not-yet-set concrete pavement stone. The photocatalytic composition applied with spray nozzles on the not-yet-set concrete blocks. 150 g/m² of photocatalytic dispersion (PD) was applied on each concrete block with a hydraulic nozzle system. The photocatalytic dispersion was a 1.6 wt % water-based TiO$_2$ dispersion stabilized to pH 10-11 with ammonia including 42% diethylenglycol as humectant and 5% Disperbyk 191. The average particle size (of TiO$_2$) in the dispersions (measured by Volume with Nanotrac NPA 252) was measured to 22 nm. The final composition had a pH of 8. The pavement concrete blocks were sprayed and left for ambient drying for 72 hours. After 72 hours, the concrete block was cut into 5×10 cm2 pieces and analysed according to ISO 22197-1.

ISO 22197-1 Test Procedure:

The NOx degrading performance of the sample was tested according to ISO 22197-1. The initial concentration of NO was 1.0 ppm and the flow of NO gas over the sample was 3 l/min. The concentrations of NO, NO$_2$ and NOx were analysed with a Horiba APNA NOx analyzer model 370. The test cell was purchased from an accredited institute. The light intensity was 1.0 mW/cm² UVA measured with a PMA 2110 UVA detector, and the relative humidity was kept constant at 45%±5%. The sample sizes in the test were 49×99 mm². The results are shown in Table 2, both for the sample directly after production and the same sample after 138 hr accelerated weathering according to EN1297:2004.

EN 1297:2004 Test Procedure.

The EN 1297:2004 test weathering procedure consists of a dry cycle followed by a wet spray cycle. The dry cycle is 300 min of 45 W/cm2±5 w/cm² UVA (340 nm) and a chamber temperature of 60° C. (BST). The wet spray cycle is 60 min of spraying de-ionized water (max conductivity of 500 μS/m) at a flow rate of 10±3 l/min/m² with an initial temperature of the water of 25±5° C. The test is continued by repeating step 4 and 5 for a predetermined number of hours.

TABLE 2

| NO degradation results after ISO 22197-1. | |
|---|---|
| | NO activity [%] |
| Directly from Production | 9.6% |
| After 115 hr ageing (EN1297:2004) | 9.0% |

The data in Table 2 show that photocatalytic concrete stone has a high NOx activity. Furthermore, the activity after ageing is the same as for the sample before ageing. This means that the photocatalytic particles are not only present as a coating layer but are incorporated in the concrete layer and is not just washed away with water.

Although the present invention has been described in connection with the specified embodiments, it should not be construed as being in any way limited to the presented examples. The scope of the present invention is set out by the accompanying claim set. In the context of the claims, the terms "comprising" or "comprises" do not exclude other possible elements or steps. In addition, the mentioning of references such as "a" or "an" etc. should not be construed as excluding a plurality. The use of reference signs in the claims with respect to elements indicated in the figures shall also not be construed as limiting the scope of the invention. Furthermore, individual features mentioned in different claims, may possibly be advantageously combined, and the mentioning of these features in different claims does not exclude that a combination of features is not possible and advantageous.

LIST OF REFERENCES USED

1 Photocatalytic concrete product
2 First surface of photocatalytic concrete product
3 Section of photocatalytic concrete producing having nano sized photocatalytic particles embedded
4 Droplets of dispersion containing nano sized photocatalytic particles
5 Spraying device, spraying the dispersion as droplet, atomized dispersion or a liquid curtain.
6 Mould
7 Concrete filling device
8 Compactor
9 Not-yet-set concrete
10 Conveyor

The invention claimed is:

1. A method of producing photocatalytic concrete product (1), said concrete product being photocatalytic by containing nano sized photocatalytic particles embedded in a section (3) including a first surface (2), the method comprises:
   providing a not-yet-set concrete product (1) having a first surface (2);
   applying an aqueous dispersion onto said first surface (2) of the not-yet-set concrete product, the dispersion containing:
      nano sized photocatalytic particles or titanium dioxide nanoparticles; and
      a solvent including a humectant selected from the group of glycol, that includes one or more of glycerol, 1,2-butanediol, 1,4-butanediol, propylene glycol, dipropylene glycol, ethylene glycol, diethylene glycol, triethylene glycol, hexasol, 1,5-pentanediol, 3-methyl-1, 5-pentanediol, isoprene glycol and/or selected from the group of polyethers that include one or more of polyethyleneglycols, polypropyleneglycols, polyethyleneglycol methyl ethers, polypropyleneglycol methyl ethers and/or selected from the group of amines that include one or more of ethanolamine, propanolamines, triethanolamine, polyether amines that include one or more of polyoxyethyleneamines, polyoxypropyleneamines, polyoxyethylene monoamines, polyoxypropylene monoamines, wherein the humectant is present in the dispersion in the range above 40 wt % and less than or equal to 50 wt %.

2. A method according to claim 1, wherein a concentration of the humectant in the dispersion is in the range between 45 wt % and 50 wt %.

3. A method according claim 1, wherein said dispersion comprises:
   a solvent or water;
   one or more co-solvents or alcohol or isopropanol up to 15 wt %;
   photocatalytic titanium dioxide nanoparticles in the range between 15 wt % and 2.5 wt %.

4. A method according to claim 1, wherein the dispersion comprises a dispersion agent for keeping the dispersion stable.

5. A method according to claim 1, wherein the dispersion is applied to said first surface in an amount of less than 200 ml/m2.

6. A method according to claim 1, wherein the dispersion is applied to said first surface during a time period of less than 5 minutes, during which time period the amount measured in ml of dispersion received at the first surface per time unit is constant.

7. A method according to claim 1, wherein the dispersion is applied to said first surface (2) by spraying the dispersion as droplets onto said first surface (2).

8. A method according to claim 1, wherein the non-yet-set concrete product is provided by filling the not-yet-set concrete (9) into a mould (6).

9. A method according to claim 8, wherein the not-yet-set concrete in the mould is compacted by vibrating and/or compressing the concrete while in the mould.

10. A method according to claim 9, wherein the compacting is performed not later than 30 minutes after the not-yet-set concrete (9) is filled into the mould (6).

11. A method according to claim 9, wherein the dispersion is applied to said first surface (2) after compacting the not-yet-set concrete (9).

12. A method according to claim 9, wherein the dispersion is applied to said first surface (2) prior to compacting the not-yet-set concrete (9).

13. A method according to claim 8, wherein the mould (6) is removed from the concrete product before the concrete is set, not later than 30 minutes after being filled into the mould.

14. A method according to claim 1, wherein the concrete product is allowed to set after the dispersion has been applied to the first surface.

15. A method according claim 1, wherein the not-yet-set concrete of the not-yet-set concrete product is form stable.

16. A method according to claim 1, wherein said nano sized photocatalytic particles or titanium dioxide nanoparticles, are discrete particles.

17. A method according to claim 1, wherein said nano sized photocatalytic particles or titanium dioxide nanoparticles, are chemically bond to the not-yet-set concrete.

18. A method according to claim 5, wherein said nano sized photocatalytic particles or titanium dioxide nanoparticles, in the first surface are in an amount of 10 g/m2 or less.

19. A method according to claim 1, wherein the nano sized photocatalytic particles or titanium dioxide nanoparticles, have a primary size less than 50 nm.

20. A method according to claim 1, wherein the nano sized photocatalytic particles or titanium dioxide nanoparticles, have an agglomerate size of less than 300 nm.

21. A method according to claim 1, wherein the nano sized photocatalytic particles or photocatalytic titanium dioxide nanoparticles, are in anatase phase.

22. A method according to claim 1, wherein the method is carried out on a conveyor (10).

23. A method according to claim 1, wherein a water to cement weight ratio is in the range of 0.3-0.7 w/c.

24. A method of producing photocatalytic concrete product (1), said concrete product being photocatalytic by containing nano sized photocatalytic particles embedded in a section (3) including a first surface (2), the method comprises:
   providing a not-yet-set concrete product (1) having a first surface (2);
   applying an aqueous dispersion onto said first surface (2) of the not-yet-set concrete product, the dispersion containing:
      nano sized photocatalytic particles or titanium dioxide nanoparticles; and
      a solvent including a humectant selected from the group of glycol, that includes one or more of glycerol, 1,2-butanediol, 1,4-butanediol, propylene glycol, dipropylene glycol, ethylene glycol, diethylene glycol, triethylene glycol, hexasol, 1,5-pentanediol, 3-methyl-1,5-pentanediol, isoprene glycol and/or selected from the group of polyethers that include one or more of polyethyleneglycols, polypropyleneglycols, polyethyleneglycol methyl ethers, polypropyleneglycol methyl ethers and/or selected from the group of amines that include one or more of ethanolamine, propanolamines, triethanolamine, polyether amines that include one or more of polyoxyethyleneamines, polyoxypropyleneamines, polyoxyethylene monoamines, polyoxypropylene monoamines, wherein the humectant is present in the dispersion in the range above 40 wt % and less than or equal to 50 wt %,
   wherein the dispersion comprises TiO2 in range of 0.5-10 wt %, an electrostatic stabiliser in the range of 0-10 wt %, a steric stabilizer in the range of 0-5 wt %, and 20-80 wt % solvent or water.

* * * * *